United States Patent

[11] 3,607,224

[72] Inventor Henry J. Blaskowski
Simsbury, Conn.
[21] Appl. No. 714,726
[22] Filed Mar. 20, 1968
[45] Patented Sept. 21, 1971
[73] Assignee Combustion Engineering, Inc.
Windsor, Conn.

[54] DIRECT REDUCTION OF IRON ORE
18 Claims, 5 Drawing Figs.
[52] U.S. Cl. .................................................. 75/26, 75/34
[51] Int. Cl. .................................................. C21b 1/02, C21b 13/02
[50] Field of Search ......................................... 75/26, 34, 93, 95, 41, 42; 266/25; 206/27, 28

[56] References Cited
UNITED STATES PATENTS
774,930    11/1904   Brown ........................... 75/26
861,593    7/1907    DeLaval ........................ 75/26
1,829,124  10/1931   Wilson .......................... 75/26
2,418,394  4/1947    Brown ........................... 75/26
2,892,698  6/1959    Patterson ....................... 75/26
3,015,554  1/1962    Rummel .......................... 75/93
3,421,884  1/1969    Pfeiffer ........................ 75/26

Primary Examiner—Winston A. Douglas
Assistant Examiner—Peter D. Rosenberg
Attorneys—Carlton F. Bryant, Eldon H. Luther, Robert L. Olson, John F. Carney, Richard H. Berneike, Edward L. Kochey, Jr. and Lawrence P. Kessler ABSTRACT: An apparatus and process for the direct reduction of iron ore to steel or high grade iron and the recovery of heat therefrom wherein pulverized coal or other carbonaceous material and oxygen or air are introduced into the upper annular portion of a reactor in a direction tangential to an imaginary circle in the annular portion so as to create a reducing atmosphere of the proper composition and temperature. Pulverized iron ore, fluxing materials and any required additional coal and oxygen are then added, also tangentially, to the reactor at a lower elevation so as to be intimately mixed. The iron ore is reduced in suspension and the molten iron or steel is tapped from the bottom of the reactor. The gaseous products of the reduction reaction are withdrawn from the reactor up through a duct which extends down through the center of the reactor and then passed to a waste heat boiler in which sensible and chemical heat are recovered.

INVENTOR
HENRY J. BLASKOWSKI
BY Richard H. Berneike
ATTORNEY

INVENTOR
HENRY J. BLASKOWSKI
BY Richard H. Berneike
ATTORNEY 3,607,224

DIRECT REDUCTION OF IRON ORE

BACKGROUND OF THE INVENTION

The conventional blast furnace reduction process suffers from several disadvantages. First, the fuel used in blast furnaces must be selected so as to minimize the impurities and concentrate the carbon. For this reason, coke rather than raw coal is used and the coking process adds considerably to the cost of the blast furnace operation. For optimum capacity, the materials charged to the blast furnaces must be concentrated and have a hardened structure so as to prevent the formation and carryover of small particles with the effluent gases. The larger the percentage of the fines in the ore, the lower the productivity and fuel economy of the process. Many of the ores which are currently being mined have a relatively large percentage of fines which must be removed and agglomerated by sintering or pelletizing prior to use in the blast furnace process. This agglomeration process also adds considerably to the expense of the blast furnace operation. In addition, considerable equipment is required to handle the coke and ore and charge these materials to the top of the blast furnace to say nothing of the equipment, such as basic oxygen converters, required to refine the pig iron to steel. In the overall process, heat recovery equipment and gas cleaning equipment is required in three places: the coke making, the blast furnace and the basic oxygen operation.

SUMMARY OF THE INVENTION

The present invention relates to an ore reduction and conversion process designed to overcome the above-noted disadvantages and to reduce the costs over prior art processes. An object of the invention is to utilize finely divided carbonaceous materials and pulverized iron ore conveyed in a gas stream to a reactor in which the iron ore reduction process as well as the conversion process are carried out primarily in suspension with the steel or high grade iron being tapped from the bottom. A still further objects of the invention is to provide a system and process for first injecting the carbonaceous material and oxygen into the reactor such that a reducing atmosphere is rapidly established and controlled in a specific zone and then for injecting the finely divided iron ore together with additional materials to maintain the proper atmosphere throughout the remainder of the reactor. A related object of the invention is to provide an efficient manner of collecting the waste gases and processing them into a valuable and easily marketable product. All of these related objects of the invention will be more readily apparent from the description of the invention and the drawings.

FIG.. 5 is a diagrammatic illustration of a three-section nozzle for feeding iron ore, coal, air, and oxygen to the reactor.

DESCRIPTION OF THE PREFERRED EMBODIMENT

The present invention involves the feeding of a carbonaceous material in finely divided form in a gas stream to a reactor in which the carbonaceous material is burned to yield an atmosphere of the proper temperature and containing a ratio of $CO_2$ to $CO$ in which the iron ore reduction process can be carried out. The carbonaceous material is preferably pulverized coal and this material will be referred to hereinafter although the invention is not to be so limited since the invention could be operative with natural gas or fuel oil as the carbonaceous material. Pulverized coke could also be employed in instances where the impurities in the coal could not be tolerated. After the atmosphere and the proper reaction temperature have been established, the finely divided iron ore and the necessary fluxing materials are introduced into the reactor also in a gas stream. At this second location, additional pulverized coal, air and oxygen are introduced into the reactor to maintain the proper atmospheric composition and temperature. The product produced in the reactor is either a high grade iron or steel and the use of either of these terms in referring to the product is intended to include the other.

Figure 1:
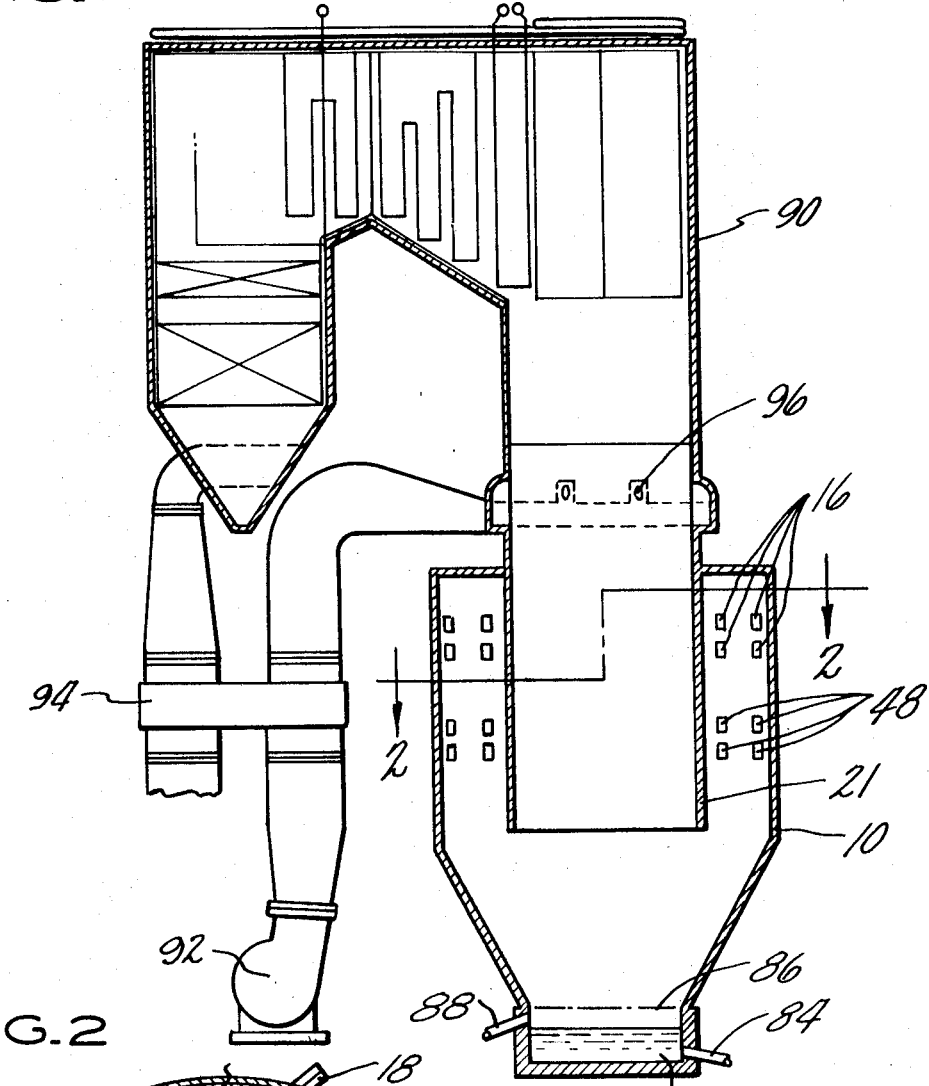
FIG. 1 is an elevation view partially in cross section of the reactor-steam generator.
Figure 2:
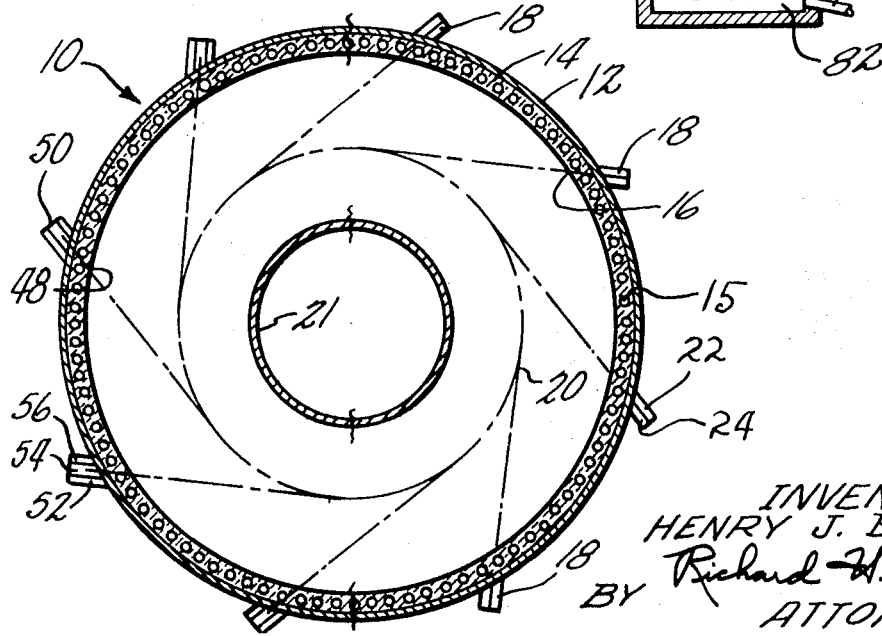
FIG. 2 is a cross-sectional view of the reactor taken along line 2—2 of FIG. 1.

Referring first to FIG. 1 and 2, there is illustrated a reactor 10 which comprises a vessel 12 and a refractory lining 14. The refractory lined reactor is cooled by means of tubes 15 (shown in FIGS. .2, 3 and 4) through which steam or boiling water is circulated. This cooling stream is tied in to the steam generating heat recovery system which will be described hereinafter. In the upper portion of the reactor 10 are a plurality of burner ports 16 in which are mounted burners. 18. These burners, which may be of any conventional design adapted to introduce and rapidly burn the fuel, are mounted in the burner ports 16 so as to introduce the fuel, air and oxygen into the reactor generally tangential to an imaginary circle 20 in the reactor as illustrated in FIG. 2. This manner of introducing the reactants produces the turbulence necessary to obtain the mixing and rapid reaction and results in a cyclonic action of the gas mass down through the reactor annulus around the outlet duct 21.

Figure 3:
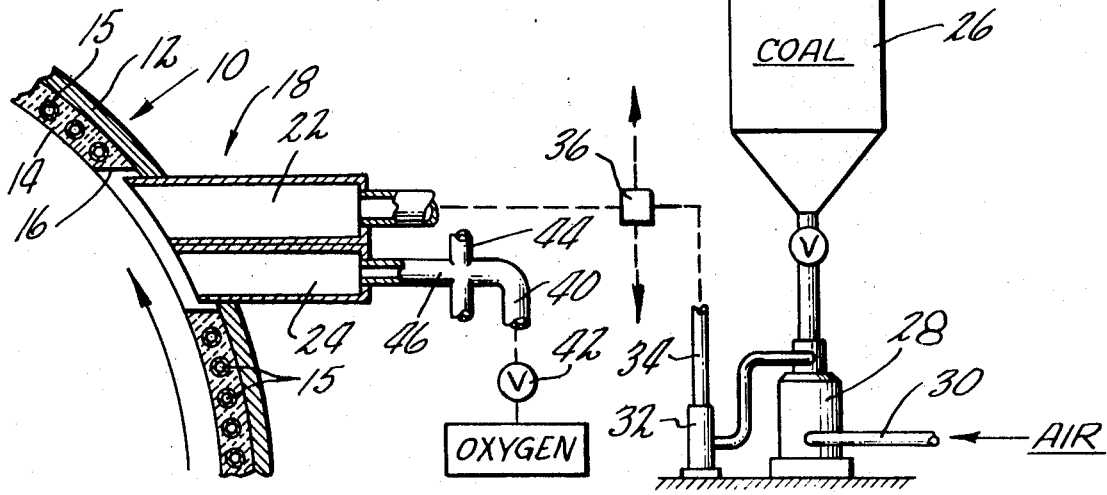
FIG. 3 is a diagrammatic illustration of a burner nozzle and the fuel feeding apparatus.
Figure 4:
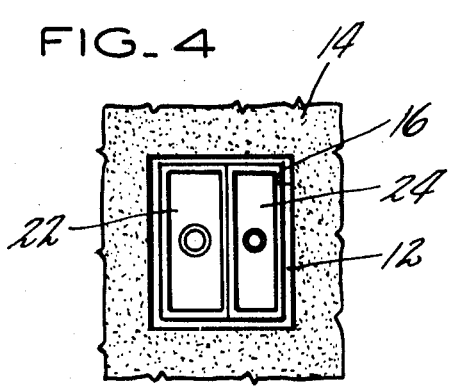
FIG. 4 is a face view of the burner of FIG. 3.

The general construction of one burner 18 is illustrated in FIG. 3 and 4 and includes a section 22 for introducing the coal and air and a separate section 24 for introducing commercial oxygen or additional air, which may be oxygen enriched, so as to impinge on the coal stream. The amount of additional oxygen or air can be varied in order to maintain the proper conditions in the reactor. The burners 18 are connected as shown in FIG. 3. The coal is fed from the bunker 26 into the pulverizer 28 in which the coal is ground to the required fineness and carried by air, which is introduced into the pulverizer from duct 30, into the blower 32. Such pulverizers and blowers are well known and are conventionally used with pulverized coal fired steam generators. Since it is essential that the fuel be burned rapidly, it is also essential that the coal be finely pulverized. A typical screen analysis would be such that at least 70percent passes through a 200-mesh screen. From the blower 32 the coal is carried via duct 34 in the air stream to a flow splitter 36 which may be of any conventional type such as the riffled splitter of U.S. Pat. No. 1,757,634. From the splitter, the coal and airstream flow to the various burners 18. It is obvious that a plurality of splitters will normally be required.

The oxygen source 38 is connected to the manifold 44 which surrounds the reactor 10 by means of the duct 40 which includes the valve 42. The burner sections 24 are then supplied with oxygen from the manifold 44 via the connections 46. It is obvious that the oxygen fed to the manifold 44 may be diluted or even entirely replaced with air. The relationships between coal, air and oxygen can be varied to establish and maintain the atmospheric condition in the reactor necessary to rapidly carry out the reduction reaction as will be further discussed hereinafter. Also, the amounts of materials introduced through the two or more levels of burners 18 shown in FIG. 1 may be varied to further control conditions.

The combustion gases formed in the upper part of the reactor spiral downwardly in the annular portion of the reactor around the reactor outlet duct 21 until they reach a secondary, lower level adjacent nozzle ports 48 and nozzles 50 at which point the iron ore is introduced into the reactor. The nozzles 50 are subdivided into nozzle sections identified as 52, 54, and 56 in FIGS. 2 and 5. These nozzles are arranged to introduce materials into the reactor generally tangentially to circle 20 as are the burners 18 so as to promote the mixing of the streams and the contact between the reactants and to further induce the cyclonic flow down through the reactor. As shown in FIG. 1, there may also be a plurality of vertically spaced levels of the nozzles 50.

The nozzles 50 are adapted to introduce iron ore and fluxing materials such as limestone or dolomite as well as additional pulverized coal and air and oxygen as required to maintain the proper reducing atmosphere and temperature. As shown in FIG. 4, the iron ore is fed from source 58 into the duct 60 and carried therethrough suspended in a gas stream from source 62. The iron ore source 58 is illustrated as a bunker but it could also be fed into the duct 60 from other sources. The preferred carrier gas for the iron ore is nitrogen or some other gas other than air, such as $CO_2$. This eliminates adding a quantity of oxygen-containing gas with the iron ore which quantity must be determined by the iron ore transport requirements rather than by the oxygen requirements of the chemical reactions involved. By doing this, the amount of oxygen required at this point in the reactor and at this stage of the reaction can be added separately and can be closely regulated. This avoids the possibility of having to introduce additional coal at this point to compensate for and react with the excess oxygen in order to maintain the proper atmosphere. Also, it is preferable to have the oxygen come into initial contact with the coal rather than with the iron ore.

Figure 5:
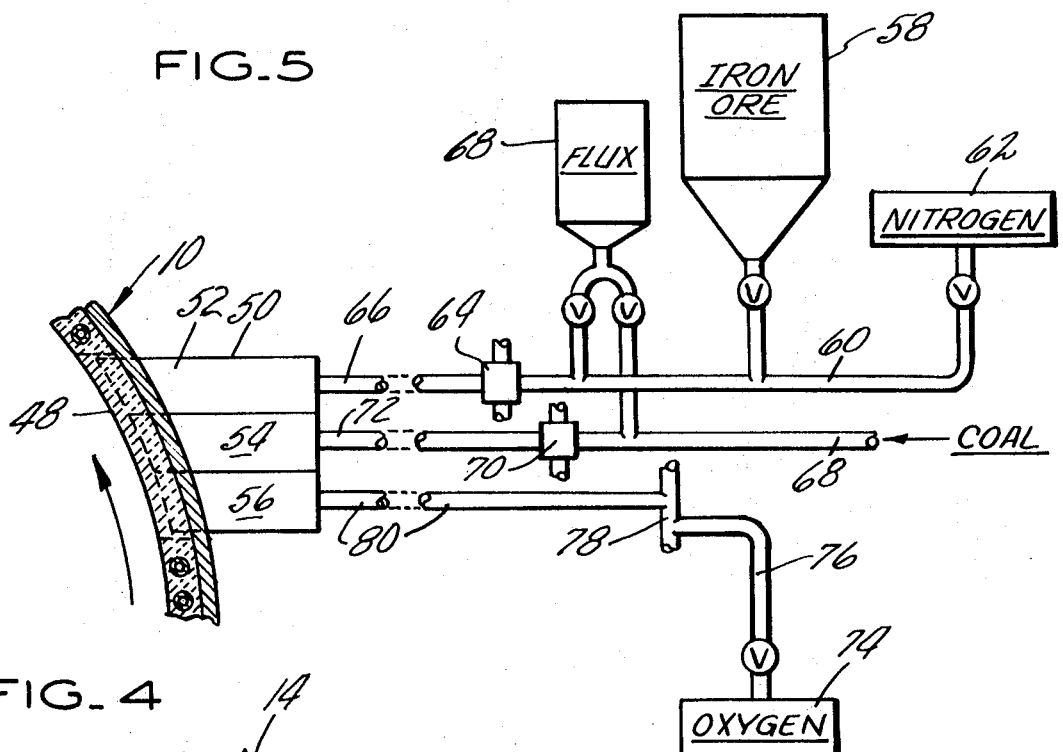

The pulverized iron ore and gas stream in duct 60 flows to a flow splitter or series of flow splitters 64 which divide the stream into the required number of separate streams. These separate iron ore streams then flow from the splitters 64 via ducts 66 to nozzle sections 52. Pulverized coal is fed by means of an airstream through duct 68 to a flow splitter 70 or group of such splitters and from there via ducts 72 to the sections 54 of the nozzles 50. The necessary fluxing materials are added to the reactor also through the nozzles 50 such as by adding them to the iron ore and/or coal streams as illustrated in FIG. 5. Commercial oxygen is fed from source 74 via valved duct 76 to a manifold 78 which encircles the reactor 10. The oxygen is then fed from manifold 78 via ducts 80 to the sections 56 of nozzles 50. By regulating the various feeding means, the amount of iron ore, coal, flux, air and oxygen can be controlled to maintain the proper conditions.

In the arrangement illustrated in FIG. 5, the coal is introduced with air through the center nozzle section 54 and the oxygen is introduced through the adjacent nozzle section 56. Such an arrangement permits the coal and oxygen to react to some degree before thorough mixing with the ore. This permits the rapid production of CO gas for the maintenance of atmosphere and temperature and leads to rapid reduction of the iron ore. The fact that the reactants at all levels are introduced into the annular space around the outlet duct 21 rather than into a large open space means that there will be an orderly flow of reactants down through the reactor with local rather than gross mixing resulting in a separation of reactor zones and permitting close control of conditions in any zone or level.

As has been previously stated, it is necessary to produce and maintain the proper atmospheric conditions in the reactor for carrying out the reduction process, i.e., the proper temperature and chemical composition. As an example, the ratio of $CO_2/CO$ may be about 0.265 by volume although this is not critical and can be varied. This ratio of $CO_2/CO$ which is determined from the equilibrium data for the reaction $$FeO + CO \rightleftharpoons Fe + CO_2$$

must be kept sufficiently low so that the reduction of $Fe_3O_4$, $Fe_2O_3$ and FeO will proceed favorably and yet it cannot economically be maintained too low because of the excess coal that would be required. Furthermore, the temperature must be maintained high enough to keep the iron in the molten state, i.e. about 3,000° F. This temperature can be varied as required such as ± 200° F.

To more fully illustrate the process, the following example gives the various amounts in pounds of materials added to the reactor to produce 1 pound of steel:

UPPER REGION (Burners 18)

| | |
|---|---|
| Coal (81% Carbon) | 0.577 |

Table—Continued

| | |
|---|---|
| Air | 2.88 |
| $O_2$ | 0.214 |

LOWER REDUCING REGION (Nozzles 56)

| | |
|---|---|
| $Fe_3O_4$ | 1.38 |
| Coal | 1.117 |
| Air | 1.66 |
| $N_2$ | 2.07 |
| $O_2$ | 1.30 |
| Flux | As Required |

The basic reactions which take place in the reactor may be divided into three groups with the first reaction taking place in the upper region of the reactor and with the second and third occuring in the lower reduction zone at basic after the introduction of the iron ore and additional coal. The first of these these reactions is generally as follows:

1. $6.51\ C + 2.47\ H_2 + 0.02S + 4.46\ O_2 + 13.37\ N_2 + 0.13\ H_2O \rightarrow 6.51\ CO + 2.60\ H_2O + 0.02\ SO_2 + 13.37\ N_2$ Although the reaction (1) has indicated complete conversion of the carbon to CO, there may be some conversion to $CO_2$. In the lower ore reduction zone of the reactor, the reactions can be considered as taking place in two parts as follows:

2. $12.6\ C + 4.77\ H_2 + 0.04\ S + 8.72\ O_2 + 7.76\ N_2 + 0.25\ H_2O\ 12.6\ CO + 5.04\ H_2O + 0.04\ SO_2 + 7.76\ N_2$

3. $Fe_3O_4 + 12.4\ N_2 + 4CO \rightarrow 3Fe + 4CO_2 + 12.4\ N_2$

In reaction (2), coal, air and commercial oxygen are reacted to create additional CO and thus maintain the proper atmosphere. In reaction (3), the nitrogen is the transport medium for conveying the iron ore into the reactor and the CO which reacts with the iron ore is the CO produced by and appearing in the products of reactions (1) and (2). Nitrogen is employed as a carrier medium for the iron ore since the use of air would introduce additional $O_2$ thus requiring additional carbon or coal to maintain the reducing atmosphere as previously pointed out. Better control can be achieved by admitting the required $O_2$ independent of the gas stream needed to feed the ore into the reactor. As an alternative, $CO_2$ gas could be used to carry the ore to avoid the possibility of $N_2$ absorption into the steel providing conditions are maintained such that at least some of the $CO_2$ carrier gas will react with carbon to form CO so as to maintain the proper $CO_2/CO$ ratio. As can be seen from the reactions, the ratio of $CO_2$ to CO leaving reactor in the products is 0.265 ($CO_2$ produced divided by the CO produced less the CO converted to $CO_2$). The amounts of materials suggested may be varied depending upon the particular conditions, such as the reactant compositions, to maintain the required atmospheric composition and temperature in the reactor.

The rate of reaction between the CO and iron oxide is dependent upon the amount of contact between the reactants and is thus dependent upon the surface area of the iron ore particles exposed to the CO. It is thus imperative that the iron ore be relatively finely pulverized prior to introduction into the reactor 10. For instance, it is preferred that at least 70 percent of the iron ore passes through a 200 mesh screen.

As the gases, iron ore particles and flux descend downwardly in a spiral through the reactor from the nozzles 48, the iron ore is reduced to iron and the flux combines with the impurities (primarily sulfur) to form slag. The amount of flux added will, of course, be dependent on the impurities present both in the ore and in the coal. A crust of solidified slag and iron will form on the cooled refractory walls of the reactor and molten iron and slag will be carried in suspension as well as down the reactor walls into the pool at the bottom of the reactor. The collected pool of iron 82 is continuously withdrawn through the tap 84 while the slag 86 which forms on the top of the molten iron 82 is withdrawn through the tap 88.

The gaseous reaction products formed in the reactor 10 as a result of the combustion and reduction processes will be at relatively high temperature, perhaps as high as about 3,000° F. and contain a significant percentage of CO, with the remainder being primarily $N_2$ with some water vapor and $CO_2$.

These gaseous reaction products are withdrawn up through the central duct 21 in the reactor 10 and passed to a stream generator, generally designated 90 in FIG. 1, which is mounted directly above the reactor-converter in a very compact arrangement. The gaseous products therefore flow directly to the steam generator without the need for ducting, storage or cleaning which minimizes the capital expense as well as the heat loss. The steam generator 90 is generally of conventional design and is therefore not described in detail.

Air from forced draft fan 92 is preheated in the air preheater 94 and then introduced into the furnace section of the steam generator through ports 96. The oxidizes the CO to $CO_2$ thereby releasing the heat of combustion of the CO. This heat of combustion as well as a significant portion of the sensible heat of the gases entering the steam generator are absorbed in the steam generator to produce steam. The steam or boiling water cooling system for the reactor 10 may be connected in with the circulating system of the steam generator 90. Since the reactor may be continuously operated, there will be a continuous supply of steam from the steam generator which can be employed to generate electrical power. As an example, for a rector unit designed to produce 100 tons of iron per hour, the amount of electrical power generated might be on the order of 400 mw.

The fact that the water cooling system of the reactor vessel itself is tied in with the steam generator 90 means that there is a large high temperature heat sink available to draw heat from the reactor. This means that the amount and thickness of materials, such as the refractory used in the reactor vessel construction can be held to a minimum.

The burner and nozzle locations and design and the fuel, ore, and oxygen feeding system permit control over the ratios of materials added to the reactor and the location of introduction which results in a high degree of control over the reactor temperature and atmosphere composition both locally and overall. The system greatly reduces the amount of equipment necessary to handle not only the cold raw materials but also to handle the hot reaction products. The system also provides the opportunity for the most economical recovery of the energy in the gaseous products.

Although a specific embodiment of the invention has been illustrated and described, it will be understood that it is merely illustrative and that changes may be made in the system and process without departing from the invention as claimed.

I claim:

1. A process for reducing iron oxide to form an iron product in a vertically extending generally cylindrical reactor having a central gas outlet duct extending down into said reactor thereby forming an annular space in said reactor around said duct comprising the steps of:
   a. introducing finely divided carbonaceous material and oxygen-containing gas into an upper oxidizing zone of said annular space in a direction so as to cause said carbonaceous material and said gas to spiral down through said annular space;
   b. reacting said carbonaceous material and oxygen in said oxidizing zone in the absence of any significant amount of iron oxide to form an atmosphere having a $CO_2/CO$ ratio capable of reducing iron oxide and a temperature sufficiently high to maintain said iron product in a molten state;
   c. introducing the iron oxide to be processed, additional carbonaceous material and additional oxygen-containing gas into a reduction zone of said annular space below said oxidizing zone in the same general direction around said annular space;
   d. reacting said additional carbonaceous material and said additional oxygen-containing gas to produce additional CO and $CO_2$, the amount of said additional carbonaceous material and said additional oxygen-containing gas being such as to maintain said $CO_2/CO$ ratio and said temperature, said CO and said iron oxide reacting to produce said iron product;
   e. removing molten iron from the bottom of said reactor;
   f. removing the gaseous reaction products from said reactor upwardly through said central gas outlet duct; and
   g. conducting said gaseous reaction products directly to a boiler wherein said CO in said gaseous reaction products is burned as wherein heat is removed from said gaseous reaction products.

2. A process for reducing iron oxide as recited in claim 1 wherein said carbonaceous material is selected from the group consisting of pulverized coal, fuel oil and natural gas.

3. A process for reducing iron oxide as recited in claim 1 wherein said carbonaceous material is pulverized coal and said iron oxide is pulverized and wherein said steps of introducing said pulverized coal and iron oxide include conveying said pulverized coal and iron oxide into said reactor entrained in gas streams.

4. A process for reducing iron oxide as recited in claim 3 wherein said coal is pulverized such that the particles are primarily smaller than 200 mesh.

5. A process for reducing iron oxide as recited in claim 3 wherein said gas stream conveying said pulverized coal into said upper oxidizing zone comprises at least a portion of said oxygen-containing gas.

6. A process for reducing iron oxide as recited in claim 5 wherein said portion of said oxygen-containing gas conveying said pulverized coal comprises air and wherein another portion of said oxygen-containing gas comprises relatively pure oxygen.

7. A process for reducing iron oxide as recited in claim 6 wherein said gas stream conveying said iron oxide into said reduction zone comprises relatively pure nitrogen.

8. A process for reducing iron oxide as recited in claim 7 wherein said gas stream conveying said pulverized coal into said reduction zone comprises air, said air comprising a portion of said additional oxygen-containing gas and wherein another portion of said additional oxygen-containing gas comprises relatively pure oxygen.

9. A process for reducing iron oxide as recited in claim 1 wherein said carbonaceous material, iron oxide and oxygen-containing as are introduced into said reactor from a plurality of locations circumferentially spaced around said reactor in each of said zones.

10. A process for reducing iron oxide as recited in claim 1 wherein said carbonaceous material, said oxygen-containing gas, said additional carbonaceous material, said additional oxygen-containing gas and said iron oxide are introduced into said reactor in a generally horizontal direction and generally tangential to an imaginary circle in said annular space.

11. The process for reducing iron oxide to form an iron product in a vertically extending generally cylindrical reactor including a central gas outlet duct extending downwardly into said reactor from the top thereof forming an annular space in said reactor around said duct and having an oxidizing zone adjacent the top of said annular space and a reducing zone spaced downwardly in said annular space from said oxidizing zone comprising the steps of:
   a. entraining pulverized coal in an airstream;
   b. introducing said pulverized coal in said airstream into said oxidizing zone of said reactor in a direction generally tangential to an imaginary circle in said annular space;
   c. introducing relatively pure oxygen into said oxidizing zone of said reactor also in a direction generally tangential to said circle, said pulverized coal and said oxygen and the oxygen in said air reacting in the absence of any significant amount of iron oxide to form an atmosphere having a $CO_2/CO$ ratio capable of reducing iron oxide and a temperature sufficiently high to maintain said iron product in a molten state, said atmosphere spiraling downwardly through said annular space;
   d. entraining pulverized iron ore in a gas stream;
   e. entraining additional pulverized coal in an airstream;
   f. introducing said pulverized iron ore in said gas stream and said additional pulverized coal in said airstream and additional relatively pure oxygen into said reducing zone of said reactor also in a direction generally tangential to said circle, said coal and said additional relatively pure oxygen and the oxygen in said air reacting to produce additional CO and $CO_2$ to maintain said $CO_2/CO$ ratio and said temperature substantially throughout said reactor, said CO and said iron oxide reacting to produce said iron product;

g. removing molten iron from the bottom of said reactor;

h. removing the gaseous reaction products from said reactor upwardly through said central gas outlet duct; and i. conducting said gaseous reaction products directly to a boiler wherein said CO in said gaseous reaction products is burned and wherein heat is removed from said gaseous reaction products.

12. The process for reducing iron oxide as recited in claim 11 wherein said gas stream entraining said iron ore comprises nitrogen.

13. The process for reducing iron oxide as recited in claim 11 including introducing said pulverized coal and said relatively pure oxygen into said oxidizing zone from a plurality of locations circumferentially spaced around said reactor wherein each of said locations for introducing said relatively pure oxygen is directly adjacent to one of said locations for introducing said pulverized coal.

14. The process for reducing iron oxide as recited in claim 13 including introducing said additional pulverized coal and said pulverized iron ore and said additional relatively pure oxygen into said reducing zone from a plurality of locations circumferentially spaced around said reactor wherein each of said locations for introducing said additional pulverized coal is directly adjacent to one of said locations for introducing pulverized iron ore and wherein each of said locations for introducing said additional relatively pure oxygen is directly adjacent to one of said locations for introducing additional pulverized coal.

15. The process for reducing iron oxide as recited in claim 14 wherein said additional pulverized coal is introduced upstream of said adjacent pulverized iron ore and said additional relatively pure oxygen is introduced upstream of said adjacent additional pulverized coal with respect to the direction of flow of the material around said annular space.

16. Apparatus for reducing iron oxide to form an iron product comprising:

a. a vertically extending reactor vessel closed at the top and having a generally circular cross section, said reactor vessel including conduit means embedded therein for conducting $H_2O$ therethrough;

b. a gas outlet duct having a generally circular cross section extending down into said reactor vessel through the closed top thereof thereby forming an annular space in said reactor vessel around said duct;

c. iron product collecting means located at the bottom of said reactor vessel;

d. a plurality of circumferentially spaced burners located adjacent the top of said reactor vessel adapted to feed pulverized coal and an oxygen-containing gas into said reactor vessel in a generally horizontal direction into said annular space said pulverized coal and oxygen-containing gas being introduced into said reactor generally tangential to an imaginary circle in said annular space;

e. a plurality of circumferentially spaced nozzles located below said plurality of burners adapted to feed pulverized coal and an oxygen-containing gas and pulverized iron oxide into said reactor in a generally horizontal direction into said annular space said pulverized coal and oxygen-containing gas being introduced into said reactor generally tangential to said imaginary circle; and f. a steam generator mounted generally above said reactor vessel and adapted to receive the gases from said reactor vessel, wherein said gas outlet duct forms a portion of said steam generator, said steam generator including a combustion zone with means for introducing combustion air to react with CO gas in the gas flowing from said reactor vessel into said steam generator.

17. Apparatus for reducing iron oxide as recited in claim 16 wherein each of said circumferentially spaced nozzles include means for introducing said pulverized iron ore entrained in a gas stream and separate means for introducing said pulverized coal directly adjacent said pulverized iron oxide and separate means for introducing relatively pure oxygen directly adjacent said pulverized coal.

18. Apparatus for reducing iron oxide as recited in claim 16 wherein said conduit means for conducting cooling $H_2O$ through said reactor vessel is operatively connected to the steam generating circuit of said steam generator.